United States Patent Office 3,159,648
Patented Dec. 1, 1964

---

3,159,648
PROCESS TO PREPARE 1,2-DIPHENYL-4-CAR-BAMOYL-3,5-PYRAZOLIDINEDIONE
Homer C. Scarborough, Evansville, Ind., assignor to Mead Johnson & Company, Evansville, Ind., a corporation of Indiana
No Drawing. Filed Sept. 2, 1960, Ser. No. 53,630
3 Claims. (Cl. 260—310)

This invention relates to 1,2-diphenyl-4-carbamoyl-3,5-pyrazolidinedione and the nontoxic pharmacologically acceptable salts thereof. The compound of this invention has the following structural formula

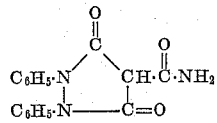

and the invention includes the nontoxic salts, such as those of sodium, calcium, iron and the organic bases, such as the amines, including ethanolamine, glucamine and the like.

The compound of this invention and its salts have an anti-inflammatory action and are useful for the treatment of various arthritides, such as rheumatoid arthritis, gouty arthritis and the arthritis of rheumatic fever. They are administered to the animal orally at a dosage of one to three milligrams per kilogram of body weight in the form of tablets, capsules or in suitable liquid vehicles, such as a syrup or an elixir.

The compound of this invention may be prepared by reacting 1,2-diphenyl-3,5-pyrazolidinedione and urea at temperatures sufficiently elevated to cause the reaction to occur, but below the decomposition temperature of the reactants or of the desired carbamoyl derivative. The reaction may be carried out under fusion conditions in the absence of a solvent or, if desired, it may be carried out in the presence of a solvent at elevated temperatures, usually above 100° C. Suitable solvents are water, toluene, chlorbenzene, 1 - methyl - 2 - pyrrolidine, dimethyl formamide, or mixtures thereof.

For a more complete understanding of this invention, reference will now be made to several specific examples.

EXAMPLE 1

*1,2-Diphenyl-4-Carbamoyl-3,5-Pyrazolidinedione*

An intimate mixture of 6.8 grams of 1,2-diphenyl-3,5-pyrazolidinedione and 3.3 grams of urea was heated at 145° C. for eighteen minutes. The glassy residue was dissolved in 30 milliliters of methanol and 100 milliliters of water added. The solution was concentrated by one-third in vacuo to partially remove the methanol and then rediluted to 200 milliliters with water. The aqueous solution (having pH 4) was extracted with three 30-milliliter portions of chloroform and concentrated slightly in vacuo to remove any traces of chloroform. The addition of concentrated hydrochloric acid (resulting solution pH 1) precipitated a white solid which was washed with water and dried over phosphorus pentoxide in vacuo. The dried solid was suspended in 40 milliliters of butanone. An insoluble solid was separated and the liquor diluted with 200 milliliters of n-heptane to furnish 5.6 grams (70% yield), M.P. 148–153.5° C. Recrystallization from methanol gave 4.6 grams (58% yield), M.P. 153–155° C.

EXAMPLE 2

*1,2-Diphenyl-4-Carbamoyl-3,5-Pyrazolidinedione Sodium Salt*

To a suspension of 0.017 mole of sodium hydride in 60 milliliters of dry benzene was added, dropwise, a solution of 4.5 grams of 1,2-diphenyl-4-carbamoyl-3,5-pyrazolidinedione dissolved in 80 milliliters of hot dry benzene. After addition was complete the mixture was stirred at room temperature for 15 minutes and then under reflux for 1¼ hours. After stirring at room temperature for an additional hour the mixture was concentrated and diluted with heptane. The solid was collected and suspended in 50 milliliters of ethyl acetate. A little insoluble material was removed with actived carbon and the liquor diluted with n-heptane (seed from isopropanol) to give a white solid. Recrystallization from 80 milliliters of absolute ethanol and from 250 milliliters of butanone gave a quantitative yield of product, M.P. 222–234° C.

EXAMPLE 3

*1,2-Diphenyl-4-Carbamoyl-3,5-Pyrazolidinedione Calcium Salt*

To a solution of 3 grams of 1,2-diphenyl-4-carbamoyl-3,5-pyrazolidinedione in 50 milliliters of ethanol was added an excess of aqueous calcium acetate solution. The mixture was allowed to stand 16 hours, diluted with water, and the solid collected. Heating this solid in 100 milliliters of ethanol caused the separation of a crystalline solid, 3.1 grams, 98% yield, M.P. 300–310° C.

As previously indicated, this invention comprehends the salts of 1,2-diphenyl - 4 - carbamoyl-3,5-pyrazolidinedione and the sodium and calcium salts are specifically disclosed in Examples 2 and 3. However, it will be readily apparent that other nontoxic pharmacologically acceptable salts may be prepared by essentially the same methods as shown in these examples. Such additional salts include those of magnesium, iron and the organic bases, such as the amines, the alkanolamines, such as ethanolamine, glucamine and the like.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A method of preparing 1,2-diphenyl-4-carbamoyl-3,5 - pyrazolidinedione which comprises contacting and heating urea and 1,2-diphenyl-3,5-pyrazolidinedione.

2. The method recited in claim 1 wherein said contacting is effected at a temperature above 100° C.

3. The method recited in claim 1 wherein said contacting is effected at a temperature above 100° C. under fusion conditions and in the absence of a solvent.

References Cited in the file of this patent

UNITED STATES PATENTS 2,700,670     Haefliger _____ Jan. 25, 1955